US006970924B1

(12) United States Patent
Chu et al.

(10) Patent No.: US 6,970,924 B1
(45) Date of Patent: Nov. 29, 2005

(54) METHODS AND APPARATUS FOR MONITORING END-USER EXPERIENCE IN A DISTRIBUTED NETWORK

(75) Inventors: Gigi Chu, Santa Clara, CA (US); Matt Burdick, San Jose, CA (US); Shekhar Bhide, Palo Alto, CA (US); Craig Dickson, San Mateo, CA (US); Sudanshu Verma, San Jose, CA (US); John Leong, Sunnyvale, CA (US); Chris Davis, San Mateo, CA (US)

(73) Assignee: Visual Networks, Inc., CA (US)

( * ) Notice: Subject to any disclaimer, the term of this patent is extended or adjusted under 35 U.S.C. 154(b) by 0 days.

(21) Appl. No.: 09/256,647

(22) Filed: Feb. 23, 1999

(51) Int. Cl.⁷ .............................................. G06F 15/16
(52) U.S. Cl. ...................... 709/224; 709/228; 717/178; 714/47
(58) Field of Search ................................ 709/224, 239, 709/245, 223, 203, 225, 226, 227, 228; 370/248, 370/252; 717/177, 178, 172, 173; 714/47

(56) References Cited

U.S. PATENT DOCUMENTS

| 5,103,227 A | 4/1992 | Betts |
| 5,251,236 A | 10/1993 | Brehmer et al. |
| 5,654,966 A | 8/1997 | Lester, Jr. et al. |
| 5,732,218 A * | 3/1998 | Bland et al. ................. 709/224 |
| 5,784,405 A | 7/1998 | Betts et al. |
| 5,889,470 A | 3/1999 | Kaycee et al. |
| 5,898,674 A | 4/1999 | Mawhinney et al. |
| 6,038,219 A | 3/2000 | Mawhinney et al. |
| 6,061,392 A | 5/2000 | Bremer et al. |
| 6,072,825 A | 6/2000 | Betts et al. |
| 6,085,245 A | 7/2000 | Kaycee et al. |
| 6,112,243 A * | 8/2000 | Downs et al. ............... 709/226 |
| 6,154,524 A | 11/2000 | Bremer |
| 6,269,082 B1 | 7/2001 | Mawhinney et al. |
| 6,493,352 B1 | 12/2002 | Mawhinney et al. |
| 6,647,058 B1 | 11/2003 | Bremer et al. |

* cited by examiner

Primary Examiner—Dung C. Dinh
(74) Attorney, Agent, or Firm—Edell, Shapiro & Finnan, LLC

(57) ABSTRACT

A network performance monitoring system uses a plurality of user modules, each user operating on a unique user machine coupled to one or more provider servers and an experience test server for collecting data from the plurality of user modules. The collected data includes at least one performance datum relating to user experience with a link from the user machine to the provider server. The system also cleanses the collected data to account for variable user configurations, user errors and the like.

29 Claims, 7 Drawing Sheets

US 6,970,924 B1

METHODS AND APPARATUS FOR MONITORING END-USER EXPERIENCE IN A DISTRIBUTED NETWORK

BACKGROUND OF THE INVENTION

The present invention relates to network monitoring and more specifically to network monitoring of end user experience.

Network monitoring is known and is commonly used to determine performance levels and to debug network errors. For example, an Internet service provider (ISP) who provides Internet connectivity to many customers might want to monitor its network to ensure that is it running smoothly. In a typical configuration, an ISP provides several POPs (points-of-presences) for user access. To connect to the network, a customer would set up their computer (a client machine, in network parlance) to dial a telephone number associated with a local POP. Once the hardware at the POP answers, it should initiate data communications with the client. The POP is coupled to the network, usually through well-known systems that need not be described here.

In debugging network problems, the service provider can run diagnostics at the POP to determine if there are any malfunctions at that POP. The service provider can also run diagnostics at its servers to determine if there are any problems there. However, a customer is not likely to care that a POP is working perfectly if that customer cannot connect to the network or is experiencing slow network traffic at the client end.

SUMMARY OF THE INVENTION

The present invention solves the problem of accurately assessing and determining end user experience with a network so that customers and service providers do not have to rely on approximations of performance derived from tests run at servers or POPs. One embodiment of a network performance monitoring system according to the present invention uses a plurality of user modules, each user operating on a unique user machine coupled to one or more provider servers and an experience test server for collecting data from the plurality of user modules. The collected data includes at least one performance datum relating to user experience with a link from the user machine to the provider server. The system also cleanses the collected data to account for variable user configurations, user errors and the like.

A further understanding of the nature and advantages of the inventions herein may be realized by reference to the remaining portions of the specification and the attached drawings.

BRIEF DESCRIPTION OF THE DRAWINGS

FIG. 3 shows various configurations of client data gathering user modules.

DESCRIPTION OF THE SPECIFIC EMBODIMENTS

In the figures, like numbers indicate like (but not necessarily identical) elements. In some cases, where many like elements are shown, not all of the like elements are called out with numbers, so that the figures are not unduly cluttered. In some instances, a number is followed by a letter in parenthesis to indicate a specific subclass of otherwise like elements.

Figure 1:
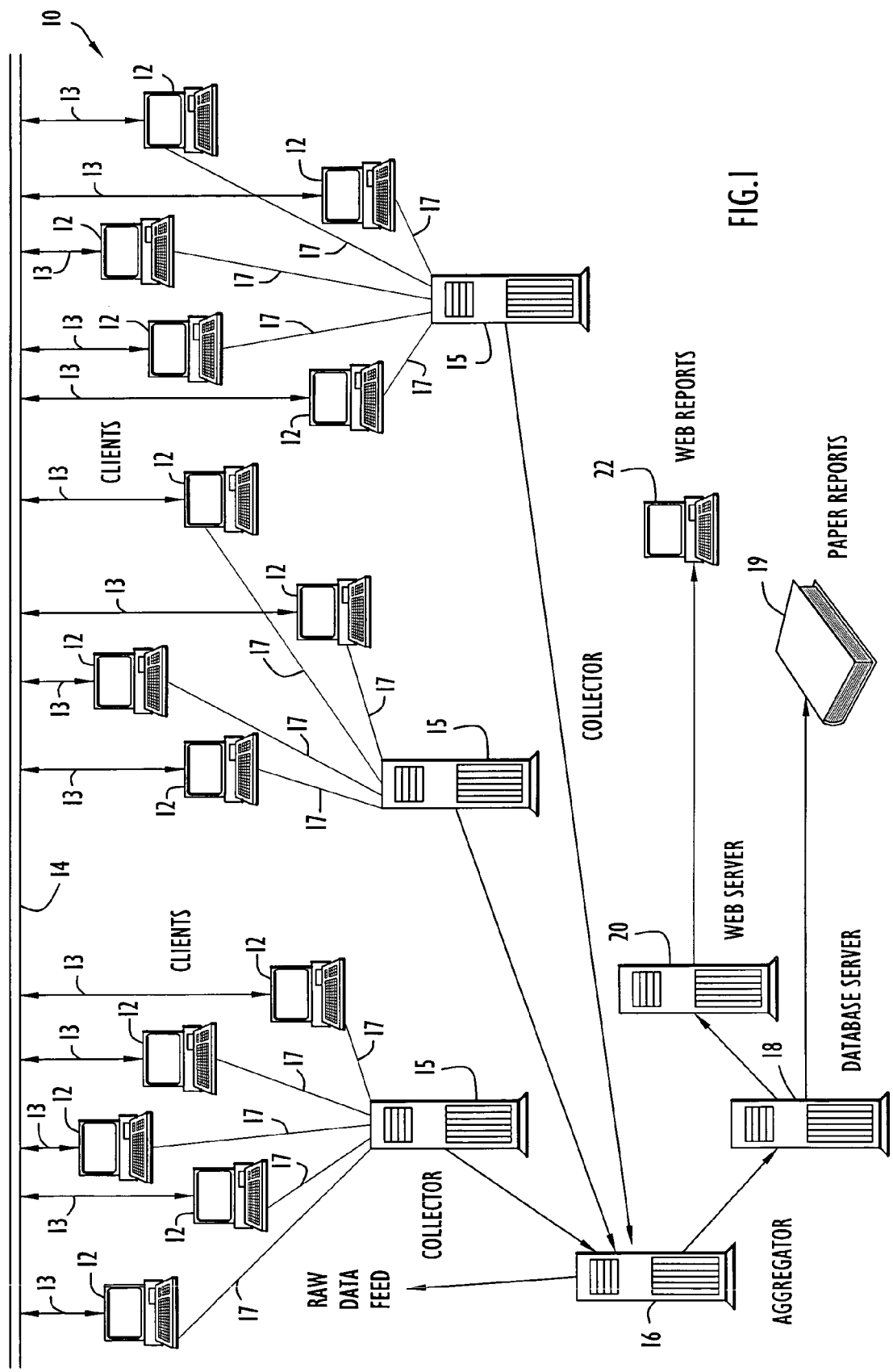
FIG. 1 is a block diagram of a network monitoring system and a network according to one embodiment of the present invention.

FIG. 1 illustrates an overall view of the operation of one embodiment of a network monitoring system according to the present invention. In that system 10, a number of clients 12 are monitored for network performance at the client end. Clients 12 are coupled via traffic lines 13 to a client-server network 14 that provides connection services to clients 12. There are many such client-server networks that system 10 can monitor. One common client-server network in use today that is in need of monitoring is an ISP (Internet Service Provider) network. In such a network, clients 12 connect to the ISP, via network 14 through lines 13. Different clients might connect to network 14 differently, but each client can still be monitored to determine the end user experience with respect to network 14. The end user experience that is monitored is generally objective data that models, or can be used to determine, how an end user might perceive the network performance. For example, if objective data indicates that a first client gets a busy signal 40% of the time a dial-up line to a service is initiated and a second client gets a busy signal 5% of the time a dial-up line to that service is initiated, it can be inferred that an end user using the first client will probably be less satisfied with the service than an end user using the second client, all other factors being equal.

It should be noted that other measures of network performance are known and might be combined with the network performance recorded by system 10. For example, programs for assessing delays in network traffic over a network, such as network 14, are known. Such programs do not measure performance as seen by the end user or from the end user's perspective. The measurement of such performance is of special interest to network service providers with demanding customers.

Each client 12 includes a user module for collecting data about the client's configuration and objective data representing the end user experience at that client. The user modules are not explicitly shown in FIG. 1, but are shown in detail in other figures. Each of the user modules communicates with a collector 15 over a monitor line 17. Collectors 15 form part of an experience test server that runs the tests of the end-user experience. Monitor lines 17 are shown separated from traffic lines 13, although in some embodiments, the functions of traffic lines 13 and monitor lines 17 are carried by the same physical infrastructure. For example, in one embodiment of an ISP monitoring system, client 12 is connected to network 14 through a TCP/IP (Transport Control Protocol/Internet Protocol, a very common protocol on the global internetwork of networks known as the "Internet") link that carries both traffic packets (line 13) and monitoring packets (line 17). By contrast, other embodiments might have lines 13 and lines 17 using separate physical infrastructures, such as a local area network for traffic lines 13 and a dial-up connection for monitor lines 17. Therefore, it should be understood that by showing the lines separately, the functions of the separate communications are more easily illustrated and it their separation is not intended to imply that the lines must be separate.

Clients 12 can be any type of computer or computing device that connects to a network or server system, be it a local area network (LAN), wide area network (WAN), the Internet, a dial-up online system or a direct connect private online system. For example, one client 12 might be a desktop computer running the Microsoft Windows 95 operating system sold by Microsoft Corporation of Redmond, Wash., while other clients 12 might be computers running the Microsoft Windows NT 4.0 operating system also sold by Microsoft or computers running the Unix operating system provided by a number of vendors.

Collectors 15 collect user experience data over monitor lines 17. While one data point from one client 12 might not be representative of the objective end user performance of network 14, when data points are collected from a great many clients, the aggregate data is often very accurate at representing the objective end user experience, especially when the data is aggregated accurately, i.e., data points are aggregated when they represent data from similar clients and are not aggregated when they represent data from dissimilar clients.

Collectors 15 are located for easy data collection, preferably in a way that does not affect network performance enough to skew the collected data. For example, with an ISP network where many POPs (points of presence) are provided for dial-up connections, a collector 15 might be provided at each POP. Alternatively, collectors 15 might be located at specified network addresses and operate independently from the ISP providing service.

Collectors 15 collect performance data from the user-modules and provide the collected data to an aggregator 16. In the preferred embodiment, the performance data is normalized and "cleaned" to allow for more accurate aggregation. The cleaning can be done at the aggregator 16 or at the collectors 15, or even at the individual user modules. Aggregator 16 provides the aggregated and cleaned data to a database server 18, from where paper reports 19 can be generated. Data from database server 18 can also be provided to a web server 20 for presentation of on-line performance reports. In one embodiment, where the database is provided on web server 20, a potential customer interested in a particular ISP's performance, or the quality control personnel of the ISP, can check the online performance using an ordinary browser 22.

Figure 2:
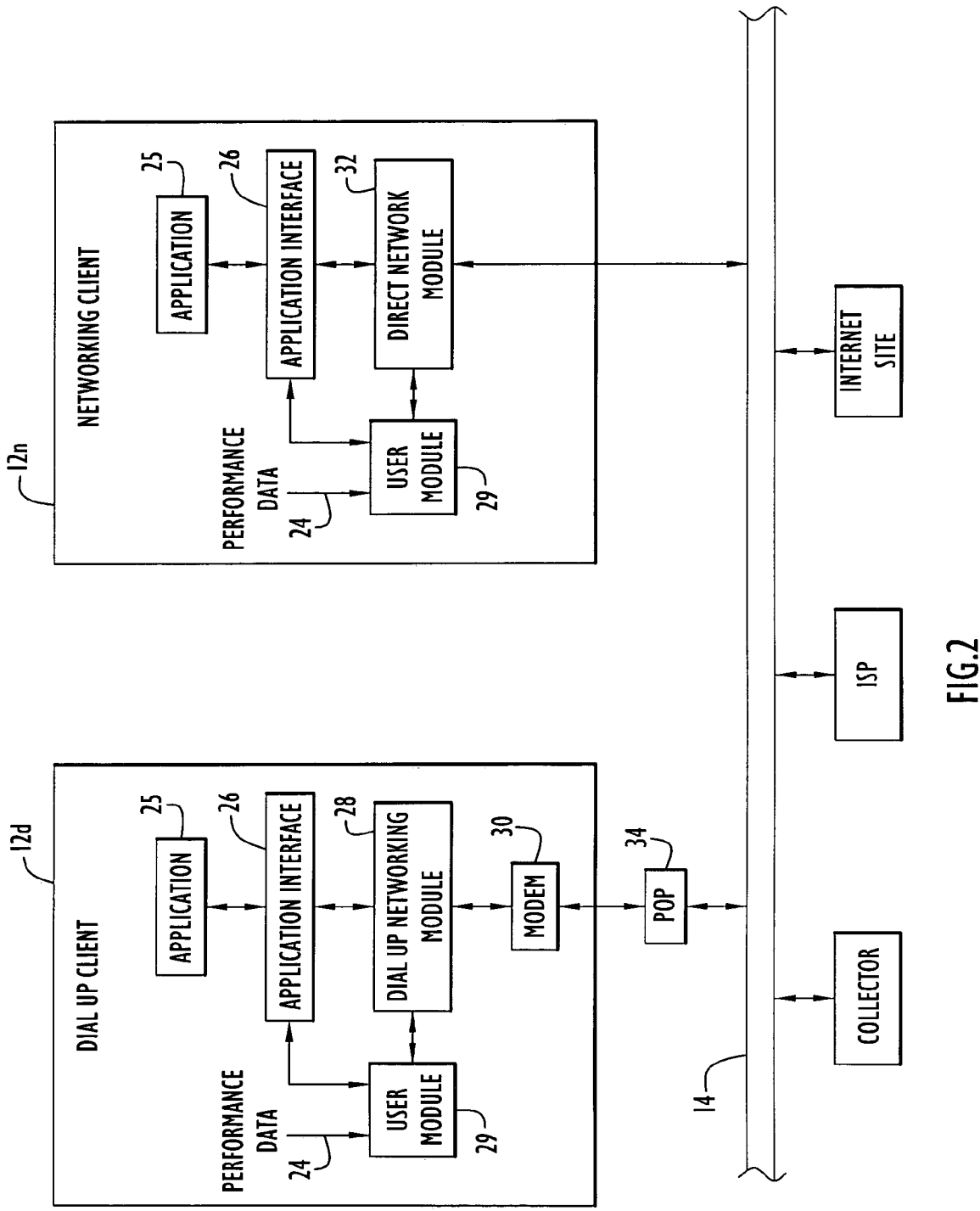
FIG. 2 is a block diagram of details of the network monitoring system shown in FIG. 1.

As shown in FIG. 2, traffic lines 13 can be connected to network 14 in a variety of ways, such as using a dial-up link, a LAN connection or other conventional connection systems. FIG. 2 shows a dial-up client 12(*d*), which uses a modem 30 and a dial-up networking (DUN) module 28 to interface client 12(*d*) to network 14 through a POP 34. Once connected, an application 25 can send and receive data to and from network 14 using an application interface 26. In the case of a LAN connection, the application connects through the application interface to a direct network module 32, which sends and receives data to and from network 14.

A user module 29 collects performance data from application interface 26 and the connection component (DUN module 28 or direct network module 32) and in some cases from application 25 directly. This performance data is shown being received on line 24. The manner in which this data is trapped and provided to user module 29 in a particular client depends on how the client is set up. While one client setup might be sufficient, several structures might be provided for, so that manufacturers of hardware and software components can select the best approach for their particular clients.

Figure 3C:
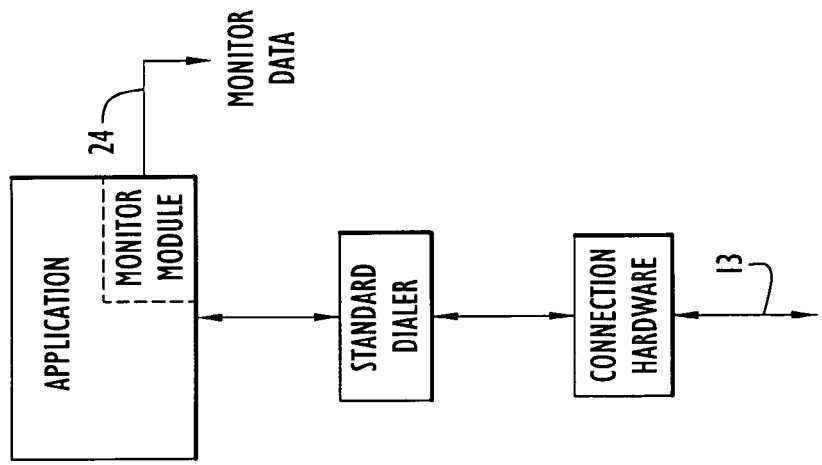
FIG. 3(c) is a block diagram of a configuration wherein an application includes a monitor module.
Figure 3B:
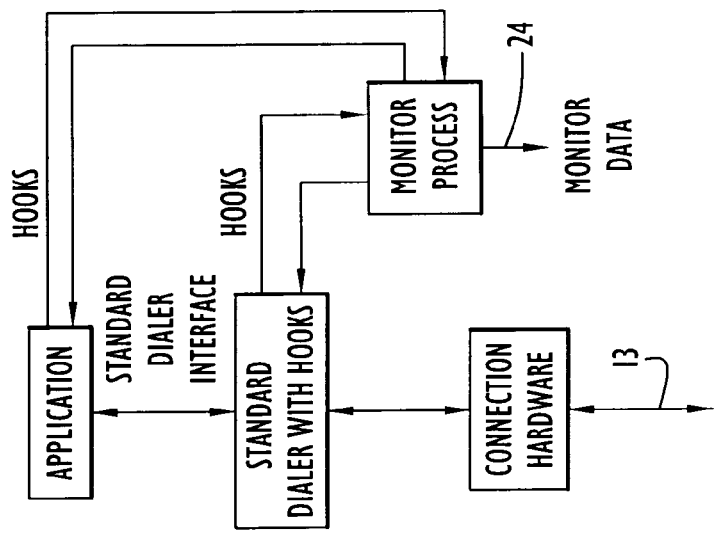
FIG. 3(b) is a block diagram of a monitoring process that hooks into executable processes.
Figure 3A:
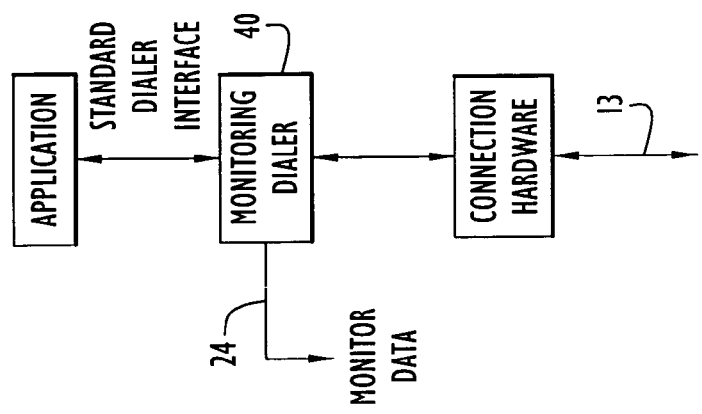
FIG. 3(a) is a block diagram of a monitoring dialer.

Three examples of client structures for trapping performance data within the client are shown in FIG. 3 and will now be described. In each case, the performance data provided to user module 29 is sent to a collector 15 (see FIG. 1), preferably using the hardware and software interface that is set up by the connection component.

The arrangement shown in FIG. 3(*a*) is referred to herein as a "dialer trapping" mode, in that the performance data is trapped in a dialer module provided with such capability. Since each application that uses network 14 must initiate a dialer (or other connection component), the performance data can be easily trapped. Thus, when a client dials into the network (or connects to it), user module 29 can record performance data and the client can transparently upload that data. In this mode, an application developer would program the application to call an application programming interface (API) of a monitoring dialer 40, instead of a standard dialer provided with a client. The monitoring dialer 40 differs from a standard dialer in that monitoring dialer 40 can verifies that components, such as a DUN interface or a TCP/IP interface, are properly installed and provide its own context-sensitive online help.

Where the substitution of an existing dialer for a monitoring dialer is not possible or not convenient, a monitor process could be used, as shown in FIG. 3(*b*). This monitor process collects the performance data by hooking into various processes that affect performance and/or configuration. Monitor process collection can be done in many different operating systems, so long as the operating system allows for one process to hook into the execution of another process.

One such operating system is the Microsoft Windows operating system. In that operating system, an application developer does not need to do any API level integration or make any code changes to support user module 29. All that is needed is that user module 29 and its hooking routines be installed on the client, preferably as start up processes. The hooking routines are provided by a call monitor that monitors calls between modules. If the call monitor is installed to start automatically when the operating system itself is launched, it can automatically capture all relevant information from any application that uses Windows' Remote Access Service (RAS) or DUN services to dial. While other versions of the Windows operating system might be used for this purpose, the preferred operating system versions in which to use the call monitor are Windows 95, Windows 98, Windows NT 4.0 and subsequent versions with 32-bit based RAS dialers with a Windows GUI (graphical user interface).

The components of a call monitor for the Windows operating system will now be described. This description covers the Windows 95, Windows 98, Windows NT operating systems and their variants. In this "monitor" mode, the call monitor is able to monitor the activities of other applications by monitoring calls from one executable module to another. In the example of the Windows operating systems, calls to Microsoft's (RAS) and Dial-Up Networking (DUN) APIs would be monitored for this purpose.

In the Windows operating system, the monitor mode is implemented by two executable modules specific to this mode and a diagnostic and recording module (ARDiag32.dll) that is shared between the monitor mode and the other modes. The two monitor-specific modules are a monitor application (ARMon32.exe) and a hook DLL (ARHook32.dll). The monitor application is launched automatically by the operating system when a user logs in. Launching upon log in is controlled by the registry entry HKEY_LOCAL_MACHINE\Software\Microsoft\ Windows\CurrentVersion\Run, which is a documented, standard Windows registry key commonly used for this purpose. That entry is added by a user module installation program. The hook DLL (dynamic link library) is injected into the address spaces of other applications (as described below), where it detects other executable modules in each process (as described below) and installs hooks that cause the hook DLL to be notified when certain functions are called (as described below). The hook DLL then communicates information about these function calls to the monitor application (as described below), which handles this information as described herein.

In order to inject the hook DLL into another process, the call monitor takes advantage of a "Win32" interface for installing system hooks. This mechanism allows an application to be aware of certain types of events happening in other processes, such as keyboard activity, mouse activity and window messages. The Win32 SetWindowsHookEx function can be called to install such a hook. That function takes as arguments the type of hook to be installed and the address of a hook function to be called whenever an appropriate event occurs. The DLL containing this function (i.e., the hook DLL) will be mapped into the address space of each process as needed, and once mapped, will remain so until the hook is removed by a call to UnhookWindowsHookEx. This is the mechanism by which the call monitor hook DLL is injected into other processes. The hook types used are WH_GETMESSAGE (which is notified each time a process retrieves a posted window message) and WH_CBT (which is notified for a variety of events including window creation and destruction). This technique is derived from article Q134655 in the Microsoft Win32 Knowledge Base and a column by Jeffrey Richter in the May 1994 issue of Microsoft Systems Journal, which are incorporated by reference herein for all purposes.

To handle communication between the hook DLL and the call monitor application, the call monitor application's instance of the hook DLL creates a shared-memory area (a Win32 file mapping object without a named file) for use as an interprocess communication buffer, and that instance sets up data structures within itself to manage the buffer as a circular FIFO queue. Other instances of the hook DLL (those actually hooking other processes) write blocks of data into this buffer containing information about events as they occur in various processes. These data blocks are read by the monitor application's instance of the hook DLL, which passes them along to the call monitor application itself. The call monitor application is thus in a position to be aware of a variety of events as they occur in other processes, more or less in real time.

In order to catch these events, the hook DLL should be hooked into each executing module. To do this, the hook DLL calls the Win32 VirtualQuery function iteratively, once the hook DLL is injected into a process's address space, to locate executable modules mapped into the address space.

The Hook DLL begins by querying for address zero, and obtains the next address to query by adding the size of the memory region (from the MEMORY_BASIC_INFO structure filled in by VirtualQuery) to the previous address. For each block thus identified, the hook DLL examines the block's properties, and if it seems like it might be an executable module (e.g., the block is committed and its BaseAddress is equal to its AllocationBase), it converts the block's address to an instance handle (HINSTANCE) and passes it to the Win32 GetModuleFileName function. If this succeeds, then the hook DLL knows that this block contains an executable module.

While the above technique for noting all of the executing modules in a system is known, some modules might be missed using just that technique, because the loading of one library may cause additional libraries to be loaded as well. So as not to miss those additional libraries, the hook DLL rescans for new modules after each successful call to the Win32 LoadLibrary or LoadLibraryEx functions, in addition to scanning for modules when the hook DLL is first injected into a process's address space. The hook DLL is aware of calls to LoadLibrary and LoadLibraryEx by using the Win32 GetProcAddress function to intercept calls to explicitly imported functions.

One way to call functions in other modules involves explicit calls to the Win32 LoadLibrary function (and/or its sibling, LoadLibraryEx) to load modules, and calls to obtain the actual addresses of functions contained in these modules. Since GetProcAddress itself is always imported (it would be a chicken-and-egg problem to try to get the address of GetProcAddress without calling GetProcAddress), this "explicit" method of linking to other modules is handled by the hook DLL by hooking GetProcAddress itself and substituting the addresses of its handler functions for the address of those functions it is interested in intercepting.

Calls to implicitly imported functions can be intercepted using the Import Address Table (IAT). Every Win32 executable module contains headers that can be traversed to determine its layout, most particularly, the location of various system tables. One of these is the Import Address Table (IAT), which contains an entry for each external function (i.e. contained in some other module) called by the module. When a module is loaded, the kernel fills in its IAT with the actual addresses of each required function. This method of linking to other modules is called "implicit" because at the source code level, it does not appear to be different from compiler- or linker-resolved function calls. When the hook DLL finds the module in a process's address space, it scans the that modules IAT looking for the addresses of functions it wants to intercept, which it replaces with pointers to handler functions of its own. To avoid circular references (and, thereby, infinite recursion), the hook DLL is careful not to scan its own IAT.

This technique is derived from a 1994 Microsoft Systems Journal column by Matt Pietrek. Additional details on the format of executable modules came from the Microsoft Developer Network article "The Portable Executable File Format from Top to Bottom", by Randy Kath. We have, of necessity, devised three extensions to Pietrek's technique. The first extension deals with modules that have their IAT segments marked read-only. Instead of blindly modifying those segments or ignoring them, the hook DLL will attempt to make these segments writable and then will attempt to modify them only if this attempt succeeds. Otherwise, the process could crash.

The second extension deals with modules that have their IAT segments shared between processes, i.e., one copy of an IAT is mapped into every process that uses the module. The hook DLL does not attempt to modify these segments, since doing so could lead to a crash in another process.

The third extension is for the hook DLL to use the addresses in its own IAT to determine the addresses to search for in other modules, for those functions which the hook DLL itself imports. This extension is necessary because other hook DLLs (from other monitoring applications provided by various other vendors, may have hooked our call monitor's hook DLL's imports just as we have hooked them, and this method prevents the creation of loops in the control path.

The hook DLL intercepts the Win32 functions LoadLibrary and LoadLibraryEx to be aware of new modules as they are introduced into the process. When a call to one of these functions succeeds and does not merely increment the reference count on an already-loaded module, the hook DLL rescans the process's address space for new modules, as explained above. The hook DLL intercepts the Win32 functions FreeLibrary and FreeLibraryAndExitThread to prevent any attempts to unload it from memory. Once injected into a process, the hook DLL must remain resident until the process terminates, because part of its purpose in life is to mislead other modules about the addresses of the functions it intercepts; if the hook DLL were to go away, calls might still be made to its function intercept handlers, which would lead to a crash. The hook DLL intercepts the Win32 function GetProcAddress to redirect calls to explicitly imported functions to its own handlers, as explained above.

The hook DLL also intercepts the RASAPI32.DLL functions RasDial, RasHangUp, RnaImplicitDial, and RnaUIDial to monitor dialup activity.

The third mode of collecting information is referred to as the "data collection" mode. In this mode, an OEM application developer can provide their own dialer and use the data upload capability of the user module by invoking it programmatically (generally, the user module does nothing until it is asked to upload specific data). This allows the OEM developer to use their own dialers, so long are the user module API is installed to allow the OEM application to perform certain diagnostic tests and upload diagnostic data. The OEM application in the data collection mode is responsible for supplying the data that should be uploaded.

Note that these three modes are not mutually exclusive. For example, the dialer mode and monitor modes can co-exist on the machine and the data collection mode is part of core functionality that is used in all the modes.

The data collected by the user module represents objective measurement of user's access attempts and network performance. That data might include user experiences since the last successful connection, including failed attempts, error codes, connection speeds, and redial events, combined with key profile information such as time-of-day, POP (point-of-presence) number, Virtual Private Network (VPN) identifier, and modem type. The profile information allows the performance data to be aggregated in an informational manner. For example, it is more informational to group failed connections by POP rather than grouping all failed connections together.

In dial-up or LAN environments, the clients can be dynamically configured to perform transparent network tests, in addition to providing experience data. These tests might be run upon each successful connection for dial-up clients or run periodically for direct-connect (e.g., LAN) clients. Such network tests might measure availability and performance of various network services from the end user's perspective. The test results and information about the network connection can be uploaded transparently along with other user module information.

The end user experience data is dynamically processed and aggregated with other users' experiences, as described above, and stored in a relational database, as might be located on database server 18. The information in the database is organized into multiple aggregate tables to support many different combinations of selection criteria, however, in order to glean useful information from the data, it might need to be massaged so that like data can be aggregated with like data.

The data collected from the user modules, by its very nature, is not in an ideally normalized form. For example, one user module might be reporting connection data relating to a POP number of *70,555-1234 while another user module might report for a PO number of 555-1234. A reader familiar with "*70" being the "turn call waiting off" code would immediately recognize that these two user modules are reporting data with respect to the same POP. In order to correlate and aggregate the data at database server 18 informatively, these similarities need to be detected. Preferably, a substitution or linkage is performed so that the two records remain grouped together.

Many such clean-up processes have been developed to make the network monitoring system usable. Several of these developed processes are described below for cleansing the user data for both reporting purposes as well as service level agreement purposes.

One process is the client clock adjustment process. Each call or test record in the collected "user experience" data is marked with a timestamp of when the event occurred. These timestamps are based on the clock on the client machine, which may not be set accurately. To compensate for the inaccuracies, the client uploads its current clock time along with the data at the time of upload. When a collector 15 receives the data, it compares its own clock (which can be assured to be accurate) with the client's clock. If they differ by a significant amount (e.g., more than 1 minute), then the timestamps in the uploaded data are adjusted by that difference. For simplicity, all timestamps are recorded in coordinated universal time. The client might also provide, as part of the uploaded data, its currently configured time zone, so that the local date/time can be calculated.

Each uploaded call record contains the actual number/ string dialed by the user. This string may contain a calling card number prefix, a dialing prefix, or other optional dialing digits or characters. For calls made within the US, the collector pattern matches the string with the list of known dialing patterns (e.g. local dialing, long distance dialing within US, call waiting cancel, outside line dialing, caller ID blocking, calling card dialing options, etc.) and extracts the area code and POP local number.

The collector also maintains a list of local and long distance dialing rules for each foreign country. These dialing rules contain a list of city codes and the number of digits for local numbers for each country, as well as dialing rules to detect local dialing, long distance dialing within the country, outside line dialing and limited calling card dialing patterns. For calls made outside of the US (i.e. dialing from a foreign country), the collector pattern matching matches the dialed string to one of the known patterns in its list to extract a city code and a POP number. If no pattern is found, the POP string provided by the user data is tagged as being "Unparseable". Being unparseable does not mean that the data is not usable, it just means that the unparseable record will be aggregated only with other records having an identical POP string.

Each uploaded call record also contains an Internet provider field. The collector backend process tries to map this field to one of the known/supported provider entries in an ISP mapping table, possibly using a regular expression. If no mapping is found, the ISP for that call record will be set to "Other". Otherwise, the ISP will be noted.

Another field contained in each call record is a modem name field. The collector process tries to map this field to one of the known/supported modem type entries in a modem mapping table in the database, possibly using a regular expression. If no mapping is found, the modem for that call record will be set to "Other".

For active test data, great care needs to be taken to ensure that the data is not tainted with extra activity occurring at the client machine. For example, before doing an active test on a dial-up link, the modem link should be unused for certain amount of time, which indicates that the user is not actively using the link. After the test is conducted, modem usage can be monitored to determine heuristically (on either the client side, or at the collector after uploading the data) whether more data was exchanged on the modem link than can be attributed to the test. If this additional data exchange is deemed to be "significant", it can be eliminated from the aggregated data for reporting purposes.

Another key datum that is needed to ensure that only like clients are aggregated is the dial-up networking version. Since the introduction of the Windows 95 operating system, there have been numerous upgrades to the Dial-Up Networking (DUN) components, to fix bugs or to provide enhancements. Knowing which version of DUN the user has increases a service provider's ability to offer better customer care. To obtain this data, the user module obtains the file version of the system component Rasapi32.dll, from which the version of the DUN can be determined (either at the client end or the collector/aggregator end) using Table 1 as a cross-reference.

TABLE 1

| Reported Rasapi32.dll Version | Release | Derived DUN Version |
| --- | --- | --- |
| 4.00.950 | Win 95 Retail | Win95 Retail |
| 4.00.953 | Win 95 Service Pack 1 | Win95 OSR1 |
| 4.00.1111 | Win 95 OSR2 | Win95 OSR2 |
| 4.00.1150 | ISDN 1.1 Accelerator Pack | ISDN 1.1 |
| 4.10.1537 | DUN 1.2 Upgrade | DUN 1.2 |
| 4.10.1903 | DUN 1.3 Upgrade | DUN 1.3 |
| 4.10.1998 | Win 98 Retail | Win98 Retail |
| 4.00 | Win NT 4.0 | WinNT 4.0 |

Figure 4:
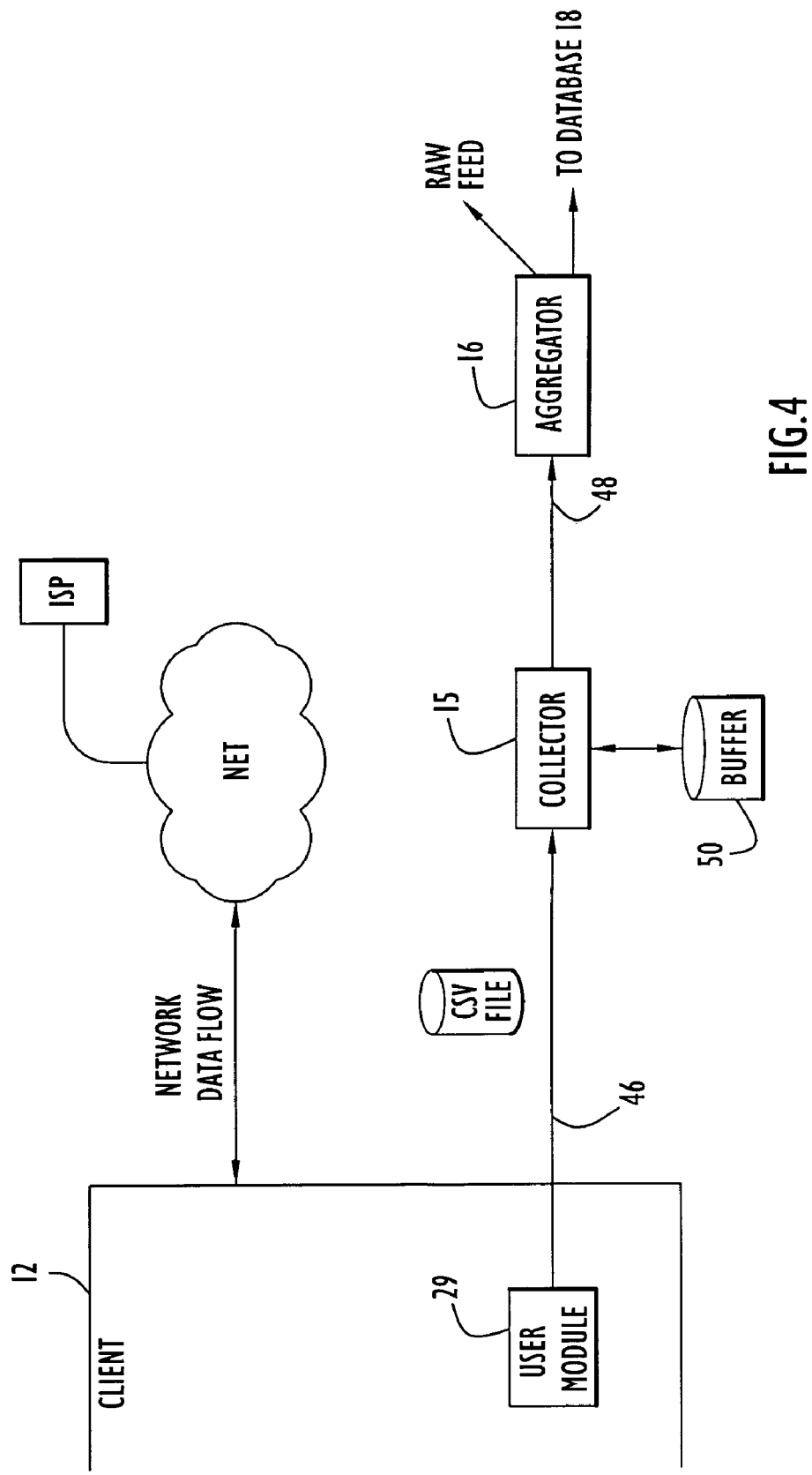
FIG. 4 is a schematic diagram showing data flows between a user module, a collector and an aggregator.

FIG. 4 shows in detail the path that data takes from a user module to aggregator 16. The collection of data is preferably done in substantially real-time, so that service providers can spot problems as they are happening at end user using clients 12.

The network monitoring system is designed such that when the network between collector 15 and aggregator 16 is operating correctly (i.e. no WAN outages), data should take no more than one minute from initial reception by a collector to insertion in the database at server 18. This is ensured by streaming the data in near real time from the clients to the database. In the case of WAN outages, data at a collector 15 is buffered in a buffer 50 at that collector until WAN connectivity has been reestablished. Preferably, buffer 50 is large enough to buffer data for a full day in the event of loss of master collector contact.

Data from clients 12 to a collector 15 is uploaded over line 46, which is preferably a HTTP connection, to take advantage of HTTP tools already available. Of course, other protocols might be used where needed. HTTP is currently preferred because it allows data packets to get through typically configured firewalls. Data can be uploaded securely (using commonly available public-private key encryption mechanisms) or insecurely (based on a configuration or version of the client software). The security mechanisms allow for authentication of correct senders and receivers, and prevent packet contents from being easily decoded as they travel through the Internet.

An example of a performance data record structure a user module 29 might use to generate Comma Separated Variable ("CSV") format files. CSV files are transferred to the collectors through a file transfer process that is scheduled regularly (every few hours, for example). The CSV file contains multiple columns—one column for each field of the upload. For example, the typical CSV file structure might be as shown in Table 2.

TABLE 2

| Attribute Column | Description | Example |
| --- | --- | --- |
| ProtocolVer | InSight data version | 3 |
| OS | Operation system platform/version | "Win 95 4.0.1212b" |
| OEM1 | OEM 1 | "ISP Name" |
| ProductVer | InSight version | "3.10" |
| RawProvider | ISP/DUN name uploaded | "ISP Name" |
| RawPOP | POP number uploaded | "555-1212" |
| RawCountry | Originating country code uploaded | "1" |
| RawCity | Originating city code uploaded | "609" |
| RawModem | Modem name uploaded | "Standard 28800" |
| PPPServerIP | PPP Server IP | "207.240.85.52" |
| RawRasUserName | RasUserName uploaded | "MyAccount" |
| PSTTime | Date/time in PST timezone | "03/15/1998 15:56:06" |
| LocalTime | Date/time in local timezone | "03/15/1998 15:56:06" |
| ResultCode | Result code | 0 |
| ElapsedTimeMs | Milliseconds from start of call/test to result code | 31147 |
| InitConnectSpeed | Initial modem connection speed | 28800 |
| IsRedial | Whether this is a redial attempt | 0 |

The data collected at collectors 15 is forwarded to aggregator 16, following any data cleansing as described above, over connection 48. Connection 48 is a persistent TCP connection. If performance is not so much a concern, a nonpersistent connection could be used. The data transfer can be done securely or non-securely.

Figure 5:
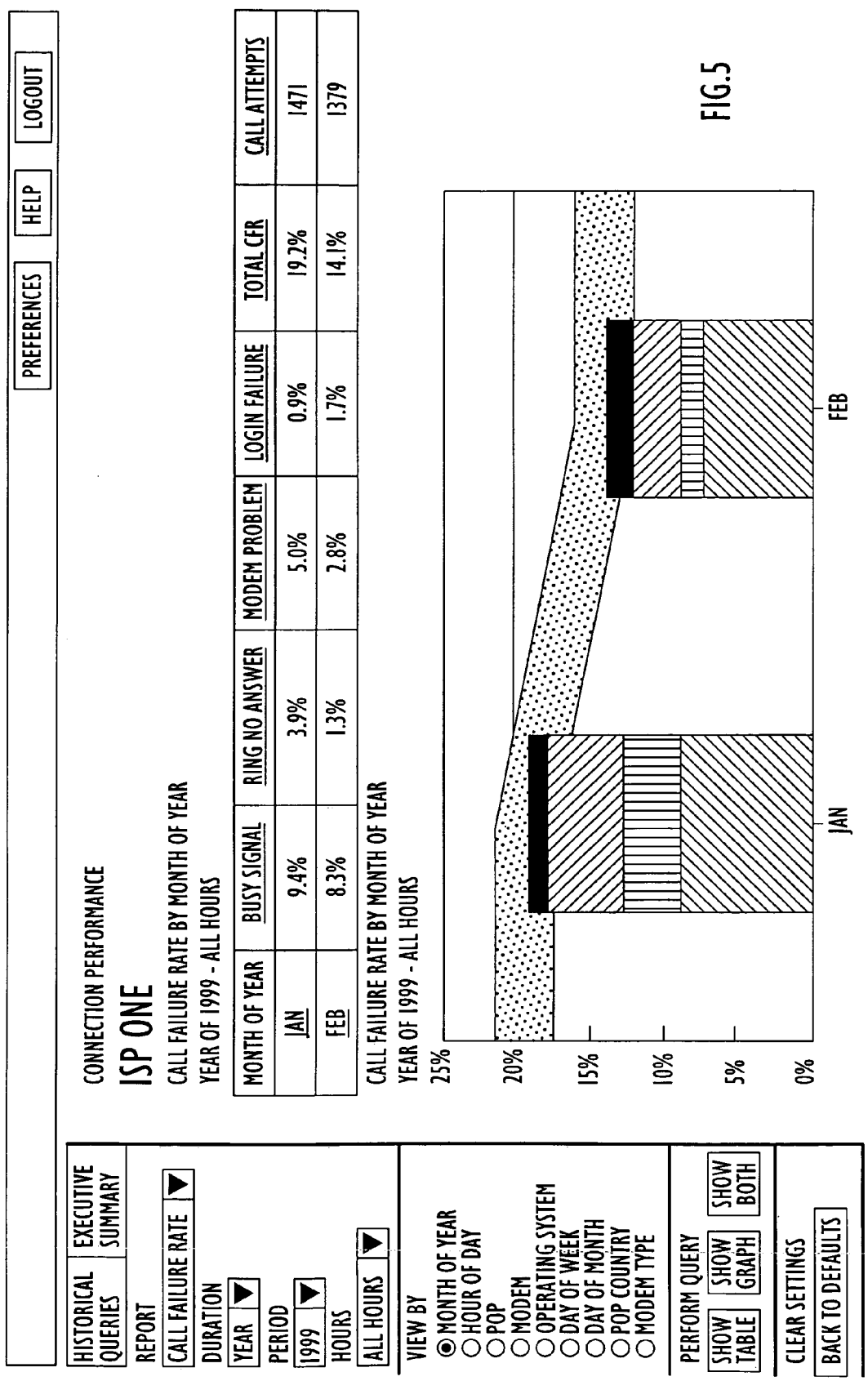
FIG. 5 is an illustration of one view of a graphical user interface, as might be used to view and analyze data collected by the network monitoring system.

Referring now to FIG. 5, and example of a query user interface for querying aggregated data is there shown. This user interface provides a simple to use interface for accessing the aggregated end-user experience information using many different views, depending on the interest of the user of the aggregated data. Examples of views include viewing failure rates by POP, time-of-day, modem type, etc; or viewing network latency by source subnet, default gateway, destination server, hour-of-day, etc. By examining the information from different perspectives, potential problem areas and/or probable causes can be identified. For example, if one POP is having more login failures per attempt than other POPs, the service provider may want to focus on troubleshooting the equipment at that POP.

If network latency to one destination server is much worse using one subnet than using another subnet, then the service provider may want to focus on troubleshooting the local router or connectivity equipment at the site(s) represented by the subnet.

Once a selected view is displayed, one can drill-down further by anchoring one of the displayed dimensions to a specific value, and select another "view by" dimension. To support the above features, the database is organized into several aggregate tables, each with multiple indices selected for the most common combinations of selection criteria. A set of stored procedures is then designed to formulate the most efficient query against the database to extract the desired information at run time. In addition, a set of stored procedures provides the information necessary to present the valid query options in the GUI dynamically. This dynamic query and presentation mechanism is implemented using a scripting language on web server 20 to generate HTML source for displaying the data on web browser 22.

Examples of a few of the view combinations are shown in Table 3, however it should be understood that the GUI can be dynamically changed to other views. In Table 3, an "x" indicates that the specific "View by" and duration (1 year, 1 month, etc.) combination is valid.

TABLE 3

| View by | 1 year | 1 month | 1 week | 1 day | Default Sort Order(s) |
| --- | --- | --- | --- | --- | --- |
| Customer | x | x | x | x | Name |
| Modem | x | x |  |  | Call Failure Rate (CFR) |
|  |  |  |  |  | Avg. Time to Login (TTL) |
|  |  |  |  |  | Average Speed (IMS) |
| POP | x | x | x | x | Call Attempts |
| Calling Country | x | x | x | x | Call Attempts |
| Calling Area Code | x | x | x | x | Call Failure Rate |
| Operating System Successful Logins (TTL) Successful Connects. (IMS) | x | x |  |  | Call Attempts (CFR) |
| Hour of Day | x | x | x | x | Time |
| Day of Week | x | x | x |  | Time |
| Day of Month | x | x | x |  | Time |
| Month of Year | x |  |  |  | Time |
| RAS Code | x | x | x | x | Call Attempts |

In addition to passively collecting performance information and profile information from user modules 29, the network monitoring system can initiate active testing at the client end. Active testing is initiated by remote collector 15 or a machine specifically configured to send out test requests. Either way, the test initiator is configured through a database or configuration file, and allocates tests to the clients made available to it (which could be in the millions) on a statistical basis. Tests can be allocated in a number of ways, such as allocation on a percentage basis and/or allocation on a time basis. For example, the test initiator might initiate a test request to send a test to a random selection of 5% of the available clients so that those clients will run an HTTP test in the hour following the test request. Time and percentage choices are preferably done on a random basis.

A large number of tests can be chosen from, such as HTTP base page tests, HTTP full page tests, network TCP connect tests, HTTP latency (header get) tests, ping tests, DNS tests, SMTP (Simple Mail Transfer Protocol) tests, POP-3 (Post Office Protocol-3) tests, etc. As needed, other tests (e.g. News tests, voice-over-IP tests, etc) can be added.

Tests are allocated based on customer name, sub-customer (or sub-OEM) name, RAS user name, POP ID, etc., or some flexible combination of these or other selections. Tests can be allocated on practically any or all parameters that a client uploads. In addition to single tests, tests can be batched together so that when one test is requested, other tests are performed (e.g., HTTP tests followed by ping tests). Furthermore, tests can be made conditional (e.g. when a specific test fails, then perform a ping test).

In summary, network management system 10 provides for automatically and easily collecting information about end user experiences with respect to network services provided to those end users. This information could be used in a number of ways, such as to assist a service provider in debugging network problems. The information gathered can also be used to provide evidence of compliance with service level agreements.

A service level agreement ("SLA") is an agreement between a service provider and a corporate or individual customer and specifies the performance of the network required by that customer. Compliance, or noncompliance, with an SLA can be determined in substantially real-time using network management system 10, since web server 20 can generate SLA reports from the real end user data. Although real end user data is often quite "dirty" and subject to the vagaries of the user's behavior and configuration, the cleansing performed by collectors 15 allows for more reliable data on the reports.

Even though the data is cleansed for reporting purposes, some service providers would not be willing to rely on this data for SLA reporting, since the SLA may entail guarantees, and possible financial penalties or rebates when certain committed levels of service are not met, and the service providers generally will not offer guarantees for problems beyond their control. Therefore, in addition to the basic information provided as described above, system 10 might also collect data indicative of customer error. This data is useful for getting customers up and running quickly, in addition to its use in SLA reporting.

Such data includes data identifying when errors are caused by either bad configuration on the end user machines (e.g., no dial tone), or to user error (e.g., user canceled the dial process or typed in a wrong password). Calls to POPs that are not correct or belong to the customer should also be flagged or eliminated from the SLA reports. This can be done by first cleansing the data as described above and then matching the cleansed phone numbers with a master list of "relevant" phone numbers.

Known errors in equipment reporting can also be flagged. For example, many modems report an initial modem connect speed that is not correct. To account for this, that data should either be eliminated in a SLA report or limited to data collected from known valid modems.

Many service providers only provide guarantees on an entire access attempt, and not each individual dial attempt. For example, a service provider's dialer might be programmed to dial a phone number A and then automatically dial a phone number B (or redial A) if A is busy, and then attempt a dial to third number (such as a toll free number) if all else fails. If the last attempt succeeds in connecting the customer, the access attempt success rate is 100%, although the dial success rate would only be 33.3%. Since the typical SLA would commit to an access attempt rate and not a dial success rate, it is important to note when multiple failed dial attempts end with a successful dial. This is a reasonable approach, since the dialer transparently handles redialing, and therefore the end user experience is a successful connection, albeit with a few more seconds of delay. Of course, the service provider could provide SLAs (and track the data) for either dial attempts or access attempts.

A service level agreement is an agreement between a service provider and a customer wherein the service provider agrees to provide a certain level of service to the customer and the service level agreement might contain financial terms tied to levels of service, such as a reduction in the fees paid by the customer if the level of service provided to the customer does not reach the agreed upon level. With such terms in a service level agreement, both the customer and the provider have an interest in being able to objectively measure the level of service, preferably through the use of objective and definite metrics for network performance.

The provider also has an interest in metrics which isolate causes of poor service so that the provider is not held responsible for poor performance caused by factors outside the control of the provider. For example, poor performance due to customer error should not affect the values for the network performance metrics. Also, errors and poor performance caused by intervening uses and network devices should also be factored out.

Figure 6:
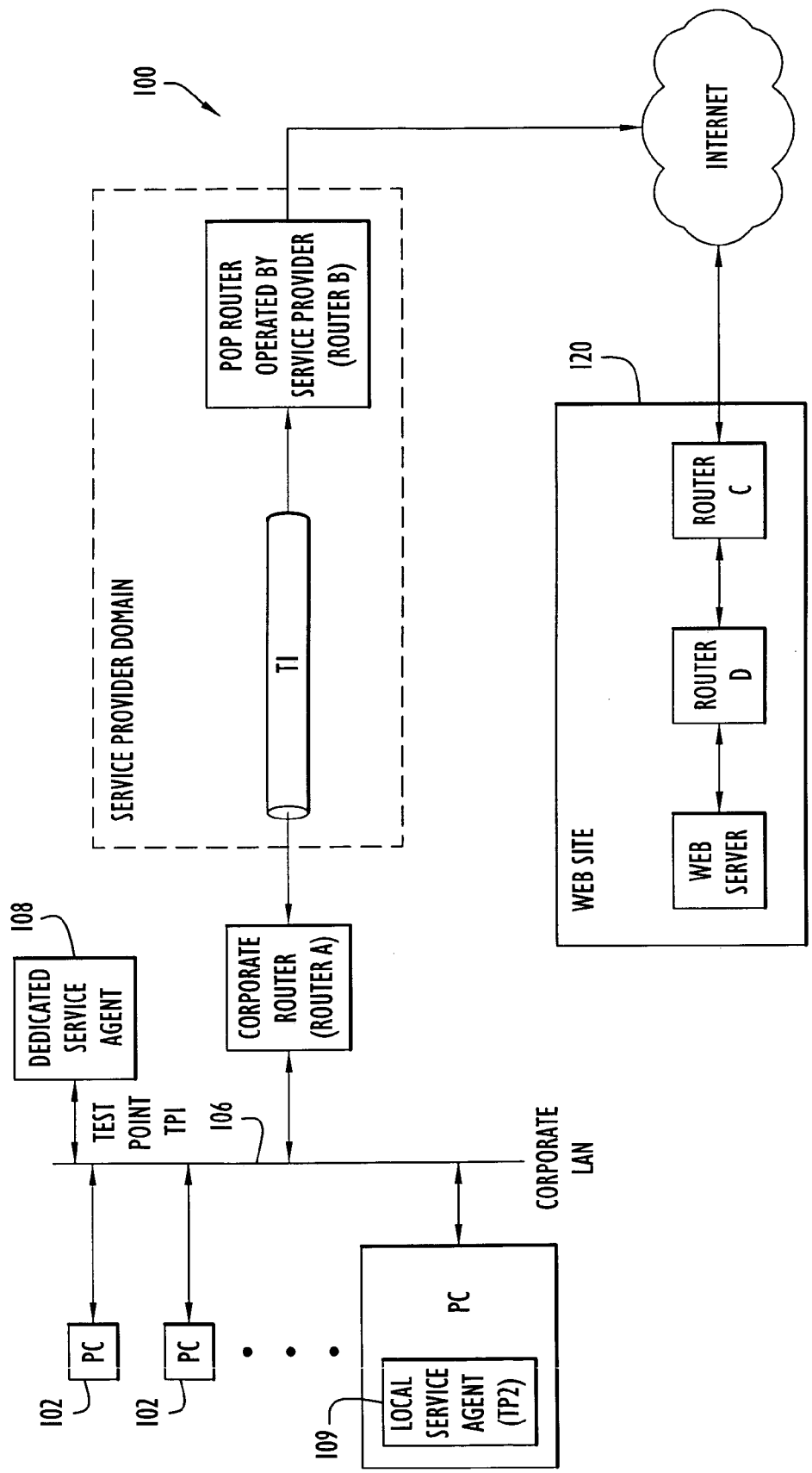
FIG. 6 is a block diagram of a part of one embodiment of a distributed network wherein levels of service are tracked and allocated among multiple providers.

FIG. 6 illustrates one such environment 100 where a customer is provided with service by a service provider and the level of service can be monitored. In the system illustrated there, a corporate customer operates a corporate LAN, to which various devices, such as personal computers, workstations and printers are attached. The corporate customer arranges for Internet services from a service provider. A router is used to couple the LAN to a link to the outside world (in this case, a T1 line). The T1 line is provided and maintained by the service provider. The router coupling the LAN and the T1 can be either the customer's equipment or the service provider's equipment. the service provider in turn provides for data traffic between the corporate LAN and the Internet in general.

As shown in FIG. 6, a number of personal computers 102 are coupled to a LAN 106 at the customer site. Service agents are also coupled to LAN 106 to assist with the service monitoring process, such as a service agent 108, which is a dedicated service agent coupled to LAN 106 at a test point TP1 and a service agent 109 running on one of the personal computers or workstations, at a test point TP2. LAN 106 is coupled to a router between the LAN and the T1 line (router A). As shown in the figure, to access a given Web page, a device on LAN 106 would route packets through router A, router B (a router at the point of presence of the service provider), as well as other routers (C, D) that might be present at the Web site of interest and other routers (not shown) that might exist on a path between router B and router C. In general, "router" refers to a connecting device or routing device that transfers data from one network to another network or transfers data between two different types of networks.

The service level agreement between the customer and the service provider might provide for a given level of service. A level of service might be defined by the quality of the connection from the customer to the service provider, using metrics such as a throughput rate (e.g., 128 KB/sec, 1.4 MB/s), a maximum packet loss rate (round trip or one way), a maximum network delay (latency), a maximum variation in delays (jitter), or a combination of these.

If the service provider is to commit to a certain level of service, the service provider would like to have a way to determine if a deficient level of service is due to service provider equipment. In a typical corporate LAN environment, several computers (desktop or server) might be fast enough to use up all of the capacity of the line provided to the customer. As a result, one computer might experience excessive packet loss as another computer dominates the connection. Unless such cases are handled appropriately, a service provider might be blamed for the losses even if the service provider equipment is working properly and operating at full speed.

To avoid such problems, test points are identified and the data gathered at the test points is correlated with data from the routers handling the data traffic. A service agent is a device (or hardware/code within a device used for other purposes) that tracks network performance at a test point. Preferably, a network being monitored has at least one test point on each portion of a network, so that the performance of the service provider, from the perspective of that test point, can be measured through service tests.

One such test is a packet loss test. From TP1 on LAN 106 near router A, service agent 108 can conduct tests of devices or servers in the Internet or beyond. For example, to measure packet loss, service agent 108 issues known patterns and numbers of special test packets (e.g., Internet Control Message Protocol, or ICMP, Echo packets, also known as "ping" packets) to any IP (Internet Protocol) device on the network or send regular User Datagram Protocol (UDP) packets to another service agent, and track how many of the packets are returned or received and what the packet latency is.

Sometimes packet loss or latency is due to factors outside the service provider's control. For example, suppose the customer has dozens of workstations, each capable of moving 100 Kb/sec and the customer subscribed to receive a 128 Kb/sec line through the service provider. If one overloading user is downloading megabytes or terabytes of data, other users may experience packet loss and/or excessive latency. If router A is busy trying to route the incoming data to the overloading user, router A will start dropping packets for other users (including the service agent at TP1). What is needed is a way to distinguish packet losses due to overloading from packet losses due to the service provider's equipment. To do this, router statistics are used.

When a service agent 108 runs a test, it first queries router A, using a network control protocol such as SNMP, and records various router statistics, such as the values in the drop counters, the CPU utilization, etc. Service agent 108 then runs an active or passive test (which may take anywhere from less than a second to many tens of seconds or even minutes, depending on the type of test). Following the test, service agent 108 reads the router statistics again and uses the change in statistics to temper the test results. If router A's counters indicate that the link from the T1 line was saturated, then dropped packets are probably caused by the LAN users, not the service provider and should be treated accordingly. Of course, if the overload was at the router and the router is the responsibility of the service provider, then the service provider is still responsible for the losses.

Routers typically keep statistics about the number of packets that they drop on a given link. They also keep additional statistics such as the number of bytes transmitted through a given interface, the number of errors seen. These statistics are typically kept as monotonically increasing counters. Routers might also keep additional statistics, such as the amount of free memory buffers on the router, the link utilization, and the CPU utilization on the router's CPU. All of these statistics are accessible typically through standard network management protocols such as SNMP.

In addition to testing router A from test point TP1, other routers can also be tested. For example, service agent 108 might test routers B, C and D. Of course, it might be necessary to get router statistics from those routers to isolate causes or poor performance. For example, if data transfer from Web site 120 is slow, the problem might be at router C or D. Routers are important pieces of network equipment, and sometimes customers or network operators are reluctant to allow some or many network management agents to access the various router statistics. While many network managers might be reluctant to grant service agents on possibly insecure machines rights to control router passwords, some managers might be open to the possibility of access by a network management console maintained in a secure Network Operations Center. In such a variation, a service agent sends a request to a network management process to query a router and return values for various router statistics. The service agent then performs the tests and requests another reading of router statistics.

Testing routers between two points in a complex network can be difficult at times, for several reasons. For one, the path that a packet takes from its source to its destination is not always known. Another difficulty is that some routers being tested are not under the control of the tester, so the tester cannot simply request that the router enter a test mode and respond to test packets from the tester. These problems are overcome by several features of the network monitoring system described herein.

As IP packets traverse the Internet, they may cross many different links. Each packet may be routed independently, meaning that many different link and router combinations may be encountered. By setting some options in the IP header of a test packet (using the Internet Control Message Protocol, or ICMP), most or all of the paths traced by a packet can be discovered. A common technique to discover a path is to modify a Time-To-Live (TTL) field present in the IP (Internet Protocol) header of each packet such that the packet "expires" at selectable distances (measured in hops or number of links traversed) from the test host. When a host or router expires the packet, it returns an "ICMP TTL expired" packet to the test host. By doing this repeatedly with successively higher TTL values, the test host can discover router IP addresses at different hop counts from itself. This method, while useful, does not list all router interfaces through which it has passed. In addition, results may be misleading because a single path is discovered.

A better way to do this test is to combine the above technique with a clever use of the Record Route option available for IP headers, to give a much more complete view of the multiple paths a packet may follow. If the test host sends out a packet with the Record Route option enabled, each router handling that packet will record an IP address into the packet before forwarding it to the next router. A packet only contains space for storing nine addresses, so only the first nine hops will be recorded in the packet. However, a test host can use the TTL technique to build a list of IP addresses for the hops along a path from the test host to the target host. A test packet is then sent to each of these intermediate hops with the Record Route option enabled. IP addresses are added to the test packet until the IP header is full. If the target is closer than nine hops distant, the ICMP response packet continues to gather an IP address for each hop until the nine-hop limit is reached. This is useful because the return path, which is often different from the initial outbound path, can be recorded as well.

Some heuristics can be applied to associate IP addresses on adjacent routers "facing" each other across a shared link. For instance, many times point-to-point links are composed of two IP addresses differing by a single digit in the least-significant byte (e.g. 208.218.140.1 and 208.218.140.2). In this way, the topology close to the test host may be discovered in some detail. This is useful for smaller contained networks typically found in enterprises.

Boundary routers (routers situated on administrative boundaries between service providers or other entities) may be discovered via heuristics using reverse DNS (hostname) lookups. Performing a reverse DNS lookup on each IP address discovered returns strings representing host names for links (e.g. 208.218.140.5 may map to inverse-gw1.alter.net). Boundary routers are those routers on which the domain names for some links differ. For instance, a router with links named "host1.inverse.net" and "host2.alter.net" may be situated on the administrative boundary between "inverse.net" and "alter.net".

Thus, boundaries between administrative domains can also be determined 110 using the whois protocol. A central server, such as the server at whois.internic.net, can be queried for the owner of a given IP address. Whois requests return domain names, administrative contacts and company names. These can be used to determine the entity responsible for the IP address. Again, routers containing IP addresses for multiple domains of responsibility are boundary routers. By using the whois database along with the discovery of the route for each of the test packets issued (using the TTL technique described above), the test host can determine which domains contribute which amount of delay and the responsibilities for delays among various routers can be accumulated to the service provider responsible for the router.

If many service agents are employed, such as one for every computer or device coupled to a LAN (such as the LAN shown in FIG. 6) or one for every client computer in the arrangement shown in FIG. 1, the network might get overloaded with packets from service agents. To avoid this, it is often useful to distribute the testing among the service agents and rely on just a sampling of data points. A method of allocating tests among a large number of clients is described below with reference to FIG. 1, but it should be understood that the same method could be used in the environment shown in FIG. 6.

Testing begins with each client contacting a collector of test data, such as collector 15. In response, the collector directs some clients to do nothing except report back after a specified time interval and directs other clients to conduct specified tests and send the test results to the collector. In the preferred method, the collector spaces the tests uniformly over time and keeps the load on each client at a reasonable level. The latter requirement can be met be tracking the number of tests conducted by each client and not ordering more than a threshold number of tests from each client.

When the client sends test results to the collector, the returned information might include the client's network address, network mask, the number of tests performed by the client in the last hour and the number of tests performed by the client in the current session. The client might also send the collector an indication of the maximum number of tests per unit time the client is configured to allow. This last feature allows the end users to limit the amount of overhead their equipment endures running tests for the collector.

Given that the number of tests that one client can run is limited, the collector should decide which tests are the best tests to run and can space the tests out appropriately. The collector can allocate tests based on a variety of factors, such as how many times a particular test has already been done.

The collector might not know how many clients are available for running tests, so it might have to adjust the number or requests made to a particular client based on how many clients respond.

Figure 7:
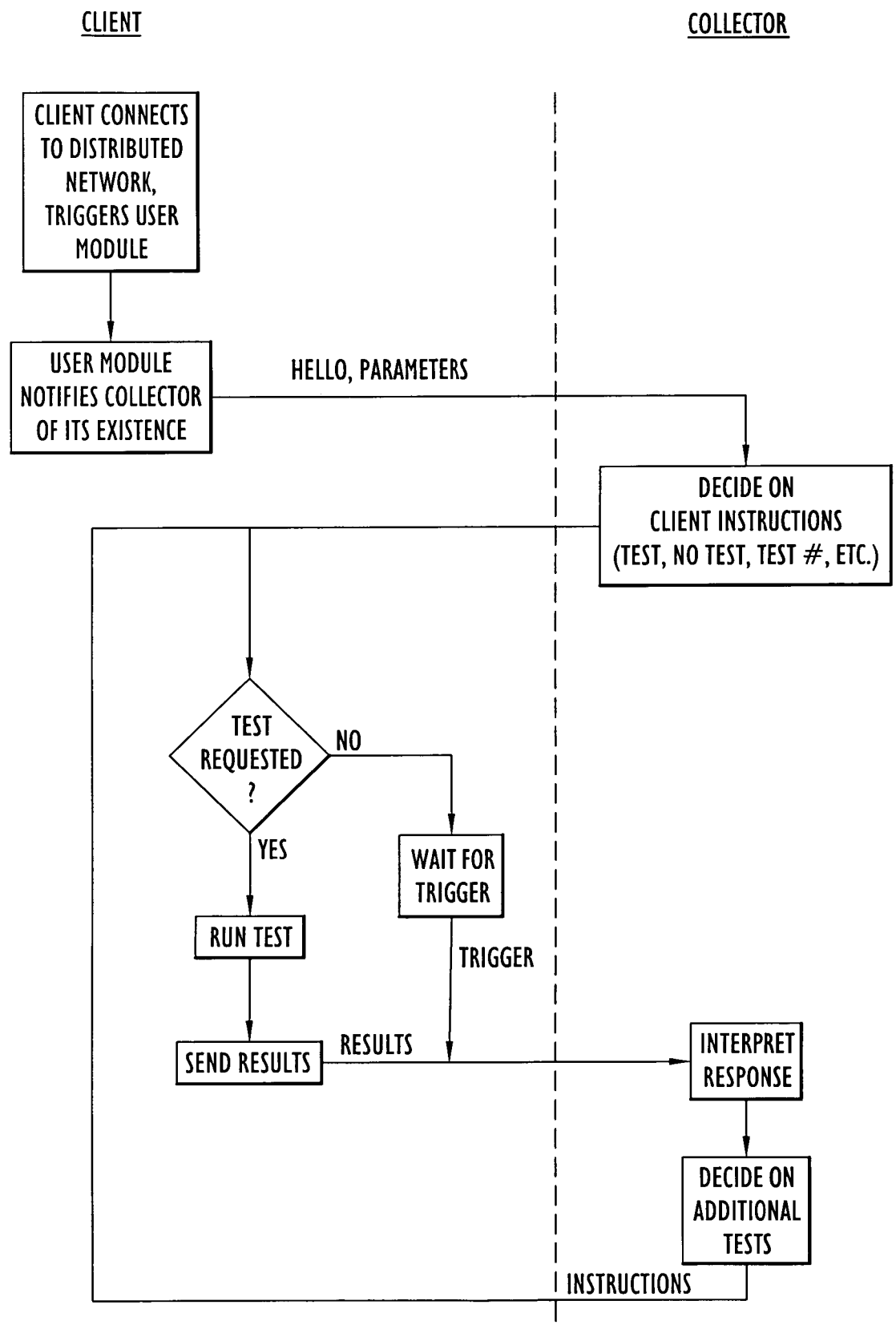
FIG. 7 is a flowchart of a communications process between a client operated by a user whose experience is being monitored and a collector that collects test results from clients.

FIG. 7 is a flowchart illustrating one process for test allocation. In the preferred embodiment, the collector (a part of the experience test server) collects test results and allocates test results, but relies in part on the individual clients to maintain state for the testing. This has several advantages. For one, with each client maintaining its state, clients can be switched from one area of the distributed network handled by one collector to another area of the distributed network handled by another collector without the collectors having to pass information between themselves. Another advantage is that, with client's maintaining their own state, a rouge collector cannot mislead a client into running more tests than the client can handle, this swamping the client to the detriment of the user's experience.

As shown in FIG. 7, a session begins when the client connects to the distributed network. When the client is connecting, the user module that runs the tests and communicates with the experience test server hooks into the connection process and gathers initial data. This could be done, for example, with the RAS hooking processes described above to hook into a RAS dialer on a personal computer where the personal computer is the client and the client is connecting to a distributed network maintained by an Internet Service Provider. In other systems, the initial data is gathered by querying a dialing system or by reading log files.

The initial data includes data about the connection that initiated the session, such as the POP telephone number, the IP number (if appropriate), the time of day and the time taken to connect to the distributed network. The initial data also includes data about the client configuration, such as processor speed, client capability and the like. Once the user module obtains this initial data, the user module sends the initial data to the collector, preferably using the link between the client and the distributed network that is already set up. The initial data might also include the client's network address, network mask, the number of tests performed by the client in the last hour; the number of tests performed by the client in the current session and the maximum number of tests per hour the client is configured to allow.

When the collector receives the initial message from the client, the collector determines what instructions to send to the client. Typically, the instructions are to run a test or to wait for a triggering event and contact the collector when the triggering event occurs. The instructions are provided to the client and the client acts on them. At this point, the collector does not assume that a response will be received from the client, because the client might have logged off or been disconnected. Since the collector does not need to maintain session information or track clients, the collector can handle many more clients than would otherwise be possible.

If the collector were the initiator of messages to clients, some session information might need to be maintained, such as an indication of whether or not the client was online. To avoid the need for session information, the collector acts as the server but does not initiate messages to the client. Instead, the client initiates the contact with the collector. This is the opposite of a typical client-server arrangement, because the server is actually the master controlling the client, as far as running tests is concerned. This reversal is dealt with in the current system by having the clients always contact a collector at the start of a session and always having a message pending at either the client or the server.

"Message pending" refers to a condition wherein one side of the communication is in the process of preparing a response for the other side. When the collector receives the initial message, it responds with a message to the client. That response message is either a request for a test, which will result in the client sending a message (containing the test results), or a request to set up a trigger. When a client is set up for a trigger, it waits for a particular event (the passage of a defined amount of time, the start of a new session, etc.) before responding to the collector. When the collector receives test results, it responds to the test result message with another message that is either a request for a test or a request to set up a trigger.

As shown in FIG. 7, the client sends an initial message with initial data to the collector and the collector decides what instructions to give the client (either a test or a trigger). If the instruction is to run a test, the client runs the test and sends the test results to the collector. If the instruction is to wait for a trigger, the client waits for the triggering event to occur and then sends a message to the collector. From that message, the collector determines what additional instructions to provide to the client. In some embodiments, the initial messages and test result messages sent from the client are of a common format and are processed using a common procedure at the collector, so the collector does not even have to keep track of whether a given message was the first, initial message from the client or a subsequent message. Of course, the message contents may well indicate whether the message is the initial "Hello" message, a test results message, or a trigger response message. If such an embodiment is used, each message could contain the initial data described above.

For many tests, the results are more informative if the tests are more or less uniformly distributed over time and over clients. To achieve this objective, the collector uses the data provided by the client to get the client to schedule tests appropriately. A client might have limits on the number of tests per hour (or other period of time) and the number of test per session. For example, if the client is a slow computer with a slow connection to the distributed network, the client might be configured to report, as part of its initial data, that the client can only run 10 tests per hour and 25 tests per session. If the collectors maintained state for clients, a collector could simply order a test and increment two counters associated with that client, with one counter being reset each hour and one counter being reset each session. However, if the collectors do not maintain state for clients, these counters must be implemented with the help of the clients.

The client provides, as part of the initial data or each message sent to a collector, and indication of the number of tests run in the current time period (current hour, day, etc.) and in the current session. The client also provides the collector with the maximum values for those numbers. If a message from a client indicates that the number of tests in the current session is equal to or greater than the maximum tests allowed for a session, the collector responds with a trigger instruction instructing the client to respond at the start of the next session (and not before). Of course, in most cases, the client will respond to the collector at the start of a new session anyway, but one reason for this trigger instruction is to effectively stop the passing of messages between the client and the collector for the current session.

If the client indicates that it has reached its test quota for current time period, the response from the collector is a trigger instruction to be triggered by the end of the current time period. At the start of the next time period, the client will respond to the collector, indicating that it has run no tests in the now current time period.

If the client indicates that it has not reached either its session quota or its time period quota, the collector responds with a request to run a specified test or responds with a trigger for a spacer period. A spacer period trigger is used to distribute the tests over time. For example, suppose a client is configured to allow only 10 tests an hour and each test takes 30 seconds. If the collector responds to each test results message with a test instruction message, the tests will complete shortly after the first five minutes of the hour and no tests will be run in the remaining 55 minutes. To avoid this, the collector could space the messages out with six minutes between them, but that would require the collector to maintain state, e.g., a timer counting down six minutes. Instead, the collector sends a trigger instruction to be triggered at the client upon the passage of ten minutes. Thus, as the client periodically sends messages in response to trigger events, the tests will be more or less evenly spaced. In some cases, the collector might not have any tests it needs run, regardless of what client quotas, so it might send a trigger instruction for a long time into the future.

The collector might have quotas as well, where a collector quota represents the number of tests that a collector should attempt to make in a test period, preferably distributed more or less evenly over the test period and over the clients that are in contact with that collector. The collector cannot be perfectly uniform in the distribution over time, because the collector cannot control exactly when the client runs the test. The collector also cannot be perfectly uniform in the distribution over clients, because the collector does not know ahead of time how many clients are going to be available and at what times.

To distribute the tests, a collector maintains a counter for each type of test it is to run and how much time is left to run the tests. For example, if a collector needs to run a "ping" test 3,600 times an hour (an average of one per second), the collector notes the time and how many test results messages have already been received for that test in that hour. If more test result messages have been received than seconds have passed, the collector backs off sending instructions requesting that particular test and instead requests other tests (that might be behind quota) or sends trigger instructions causing clients to run no tests for a time. If not enough test result messages have been received, that test is allocated to more clients as those clients call in to the collector (with test results messages or trigger response messages).

The collector needs to wait for clients to contact the collector before a test instruction can be sent out. Since the collector does not know beforehand how many clients will call in or how many tests each client can run, the collector prioritizes tests. To do this, all the tests that a collector needs to run are grouped into test groups. Each test group has a test group filter that specifies which clients can run tests from that test group, e.g. client's IP address must be from a subnet specified in the test group filter. In deciding which test to order from a client that has sent in a message, the collector creates a list, physically or logically, of the test groups that (1) have tests that need to be run and (2) have test filter criteria that includes the client. From that list, the collector selects the test with the least percentage of completions. For example, if there are two test groups still having tests to run where the client matches their test filter criteria, with 10% of the tests in a first test group being done and 80% of the tests in a second test group being done, the collector will order a test from the first test group from that client.

The experince test collection system described above can collect many details of the "system" configuration from the end-user's machine, such as operating system version, available system resources (disk space, memory etc), available application software (e.g., which browser and version is used), networking configuration (e.g., which modem or LAN adapter is used, hardware and related software configuration). If all of this system information is being tracked, considerable amount of network traffic would be needed to transport this system information each time a network test is performed. Most of the time this information is relatively static and does not change so, to optimize the process of collecting, storing and displaying this information, the collection system takes advantage of the fact that this information is static.

The system information can be displayed in a simple manner by using system profiles, where a system profile is a unique combination of system information. This information can be tagged, saved and displayed only once. Subsequent call records of network performance can be tagged by simply noting the profile used to obtain the network experience. Furthermore, the system can be further optimized where (a) clients upload the system profile information only when there are changes and (b) when there is a change, the client uploads only the information pieces that have changed. Furthermore, to help aid the end-user directly, the system can log, in an easily readable file on the user's computer, information about what configuration parameters have changed and when.

As detailed above, the network monitoring system described herein provides a multi-tier architecture for acquiring, collecting, aggregating, storing and analyzing end-user network experience. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A network performance monitoring system comprising:
   a plurality of user modules, wherein each user module operates on a unique user machine coupled to one or more provider servers;
   an experience test server for collecting data from the plurality of user modules, wherein the collected data includes at least one performance datum relating to user experience with a link from the user machine to the provider server; and
   means for cleansing the collected data to account for variable user configurations, wherein the means for cleansing identifies when given data samples with disparate values represent similar samplings due to user configuration variations.

2. The apparatus of claim 1, wherein the user machines are couple to the provider servers over dial-up connections.

3. The apparatus of claim 2, further comprising a service level report generator, wherein a service level report generated by the service level report generator is a report indicating the level of service provided to the unique user machines and the level of service is based, at least in part, on the cleansed collected data.

4. The apparatus of claim 1, wherein the data samples represent point-of-presence IDs and the disparate values result from user variations in representations of point-of-presence IDs.

5. The apparatus of claim 1, wherein the data samples are clock times and the disparate values result from user variations in local clocks.

6. The apparatus of claim 1, wherein the experience test server further comprises logic to allocate tests among the plurality of user modules.

7. The apparatus of claim 6, wherein the logic to allocate the tests among the plurality of user modules is logic that operates without requiring prior knowledge of the number of user modules available for running tests.

8. The apparatus of claim 6, wherein the logic is logic programmed to allocate tests based on one or more criterion, wherein the one or more criterion are selected from a test type, matching test parameters, maximum number of tests, test durations and conditions under which tests can be allocated.

9. A method of monitoring an end-user experience of attempting to connect a client system to a distributed network, comprising:
   detecting that a user is attempting to connect the client system to the distributed network;
   monitoring a connection code to obtain user experience data about the connection process, wherein the connection code indicates whether the client system has successfully established a connection to the distributed network, and wherein the user experience data is data relating to the user's experience, prior to establishing a connection to the distributed network, of attempting to connect to the distributed network; and
   transmitting the data obtained from the connection process to a collector of user connection experience.

10. The method of claim 9, wherein monitoring is done as a background process.

11. The method of claim 9, further comprising:
    executing tests on the distributed network from a test point;
    querying routers to determine router statistics; and
    adjusting results of the executed tests based on the router statistics.

12. In a network monitoring system for monitoring network-based services over a distributed network accessible by user devices capable of collecting data about end-user experience and communicating network performance data to an experience test server, a method of monitoring network-based services, comprising:
    configuring the user devices to notify the experience test server of an availability to perform network performance tests in response to being connected to the distributed network;
    distributing instructions from the experience test server to the user devices that are available to perform network performance tests, in accordance with notifications from the user devices, wherein at least some of the instructions direct the user devices to perform network performance tests; and
    collecting, at the experience test server, network performance data generated by the user devices that perform the network tests;
    wherein upon receiving an availability notification from a user device, the experience test server sends an instruction to the user device irrespective of whether the experience test server instructs the user device to perform a network performance test, and wherein instructions that lack test requests direct the user device to contact the experience test server in response to occurrence of a trigger event.

13. The method of claim 12, wherein the instructions distribute the network performance tests over time to available user devices.

14. The method of claim 12, further comprising:
    checking test quota limits associated with a user device before instructing the user device to run a test.

15. The method of claim 12, further comprising:
    dynamically controlling a rate of test allocation to distribute tests over a test period based on a current test rate.

16. The method of claim 12, further comprising:
    dynamically changing test allocation among user devices without prior knowledge of number of user devices available for testing.

17. The method of claim 12, wherein performance of the network performance tests is transparent to the users operating the user devices.

18. The method of claim 12, wherein transmission of the network performance data from the user devices to the experience test server is transparent to users operating the user devices.

19. The method of claim 12, wherein the user devices are connected to the distributed network under control of users who are customers of a provider of the network-based services.

20. The method of claim 12, wherein the user devices maintain information relating to their own testing state, and the experience test server does not maintain testing state information for individual user devices.

21. A network monitoring system for monitoring network-based services over a distributed network, comprising:
    a plurality of user devices capable of performing network performance tests and collecting data about end-user experience, wherein the user devices are configured to notify an experience test server of an availability to perform network performance tests in response to being connected to the distributed network; and
    the experience test server, configured to receive availability notifications from the user devices and to distribute instructions to the user devices that are available to perform network performance tests, wherein at least some of the instructions direct the user devices to perform network performance tests, and wherein the experience test server collects network performance data generated by the user devices that perform the network performance tests;
    wherein, upon receiving an availability notification from a user device, the experience test server sends an instruction to the user device irrespective of whether the experience test server instructs the user device to perform a network performance test and wherein instructions that lack test requests direct the user device to contact the experience test server in response to occurrence of a trigger event.

22. The system of claim 21, wherein the user devices perform network performance tests that are transparent to the users operating the user devices.

23. The system of claim 21, wherein the user devices send network performance data to the experience test server in a manner transparent to users operating the user devices.

24. The system of claim 21, wherein the experience test server distributes instructions to available user devices such that performance of the network performance tests is distributed over time.

25. The system of claim 21, wherein the experience test server checks test quota limits associated with a user device before instructing the user device to run a test.

26. The system of claim 21, wherein the experience test server dynamically controls a rate of test allocation to distribute tests over a test period based on a current test rate.

27. The system of claim 21, wherein the experience test server dynamically changes test allocation among user devices without prior knowledge of number of user devices available for testing.

28. The system of claim 21, wherein the user devices are connected to the distributed network under control of users who are customers of a provider of the network-based services.

29. The system of claim 21, wherein the user devices maintain information relating to their own testing state, and the experience test server does not maintain testing state information for individual user devices.

* * * * *